(12) United States Patent
Brelay

(10) Patent No.: US 7,450,831 B2
(45) Date of Patent: Nov. 11, 2008

(54) METHOD FOR DVD-SUBPICTURE COMPOSITING IN 420 CHROMA FORMAT

(75) Inventor: Herve Brelay, San Jose, CA (US)

(73) Assignee: LSI Corporation, Milpitas, CA (US)

( * ) Notice: Subject to any disclaimer, the term of this patent is extended or adjusted under 35 U.S.C. 154(b) by 947 days.

(21) Appl. No.: 10/414,747

(22) Filed: Apr. 16, 2003

(65) Prior Publication Data

US 2004/0208474 A1 Oct. 21, 2004

(51) Int. Cl.
*H04N 5/91* (2006.01)
*H04N 7/01* (2006.01)
(52) U.S. Cl. .............................. 386/131; 386/1; 386/46
(58) Field of Classification Search .................... 386/1, 386/45, 131
See application file for complete search history.

(56) References Cited

U.S. PATENT DOCUMENTS

| | | | | |
|---|---|---|---|---|
| 5,111,297 A | * | 5/1992 | Tsuji et al. | 348/565 |
| 6,674,479 B2 | * | 1/2004 | Cook et al. | 348/453 |
| 2001/0055340 A1 | * | 12/2001 | Kim et al. | 375/240.21 |
| 2002/0034252 A1 | * | 3/2002 | Owen et al. | 375/240.17 |
| 2003/0133696 A1 | * | 7/2003 | Soda | 386/68 |

* cited by examiner

*Primary Examiner*—Thai Tran
*Assistant Examiner*—Girumsew Wendmagegn
(74) *Attorney, Agent, or Firm*—Christopher P. Maiorana, PC

(57) ABSTRACT

An apparatus comprising a first circuit and a second circuit. The first circuit may be configured to generate a first composited data signal and a second composited signal in response to a first data signal having a first chroma format and a second data signal having a second chroma format. The second circuit may be configured to generate a first composited output signal having the first chroma format in response to the first and the second composited data signals.

20 Claims, 4 Drawing Sheets

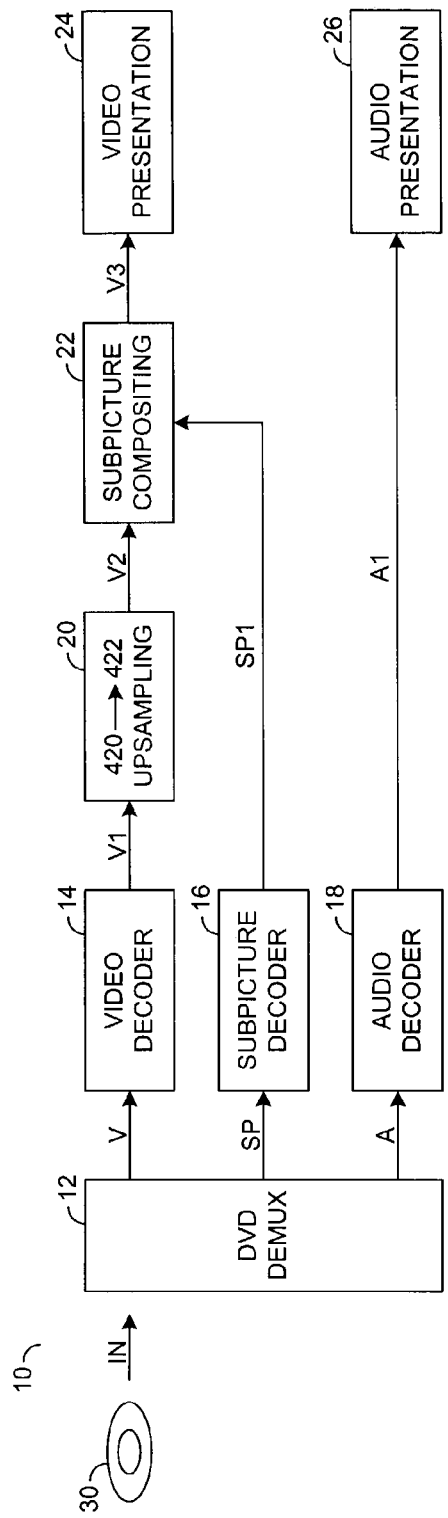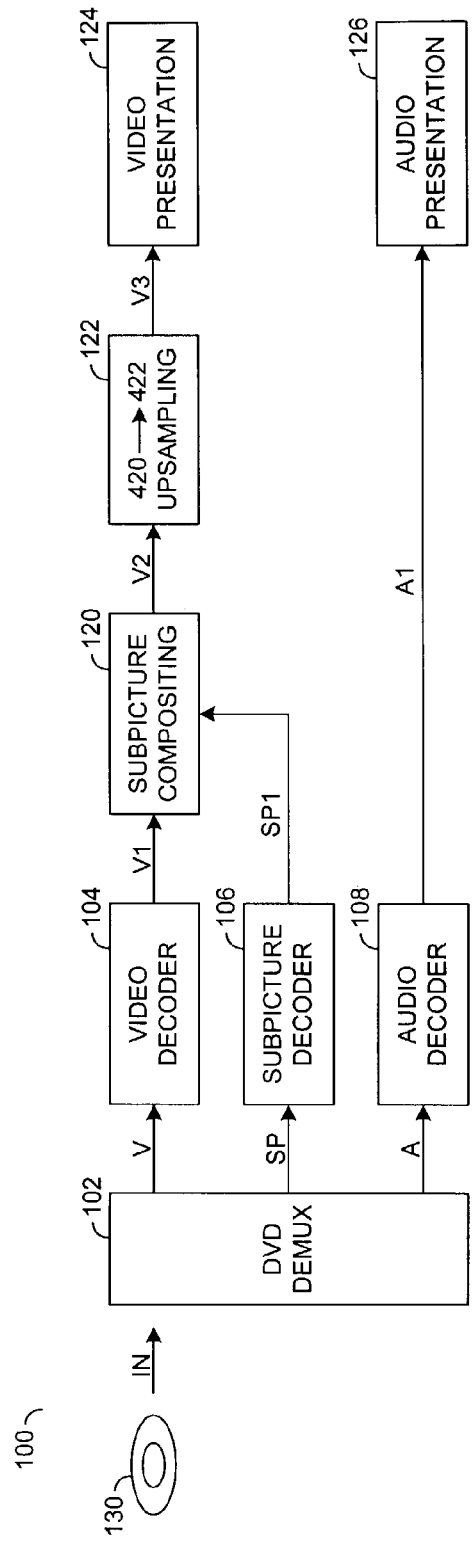

METHOD FOR DVD-SUBPICTURE COMPOSITING IN 420 CHROMA FORMAT

FIELD OF THE INVENTION

The present invention relates to DVD playback generally and, more particularly, to a method for DVD-subpicture compositing in 420 chroma format.

BACKGROUND OF THE INVENTION

Presentation data read from a digital video disc (DVD) can include video, audio and subpicture data multiplexed with navigation data in conformance with the MPEG-1 or MPEG-2 program stream specification. The video data exists as one stream of data compressed according to the MPEG-1 or MPEG-2 video format. The video data is generally stored on the DVD with a 420 video format.

Subpicture data can consist of data such as subtitles, menus, karaoke lyrics, etc. that can be overlaid as a bitmap onto the main video content. The subpicture data is compressed using run length encoding. Subpicture data is stored in a 444 chroma format using a 16-color lookup table. When the subpicture data is run-length decoded, a color index (e.g., a 4-bit index mapping to a table holding 16 different colors, each specified with luminance and chrominance (e.g., Y, Cr and Cb) values) is obtained.

Referring to FIG. 1, a system 10 is shown illustrating a conventional DVD playback scheme. The system 10 includes a DVD demultiplexer block 12, a video decoder 14, a subpicture decoder 16, an audio decoder 18, an upsampling block 20, a subpicture compositing block 22, a video presentation block 24 and an audio presentation block 26. The DVD demultiplexer block 12 receives a presentation data signal (i.e., IN) from a recorded disc 30. The DVD demultiplexer block 12 demultiplexes the signal IN to retrieve the video data signal (i.e., V), the subpicture data signal (i.e., SP) and the audio data signal (i.e., A). The video decoder 14 processes the signal V and presents a signal (i.e., V1) to the upsampling block 20. The upsampling block 20 performs a 420 format to 422 format upsampling routine to generate a signal (i.e., V2). The subpicture decoder 16 converts the subpicture signal SP to a subpicture signal SP1. The subpicture signal SP1 is in the 444 16-color lookup table format. The subpicture compositing block 22 combines the signal V2 (i.e., the 422 format video signal) with the signal SP1 to generate a composite 422 format chroma signal (i.e., V3).

The video presentation block 24 presents the video images in response to the signal V3. The audio decoder 18 presents a signal A1 to the audio presentation device 26. The audio presentation device 26 presents audio signals, through devices such as loudspeakers, in response to the audio signal A1.

The conventional DVD playback scheme of compositing the 422 chroma format main picture information and the 444 16-color lookup table subpicture information uses a large amount of memory space and a large amount of DMA bandwidth. A large amount of memory and DMA bandwidth add to the expense of the DVD playback system. It would be desirable to reduce the amount of memory and DMA bandwidth used in a DVD playback system.

SUMMARY OF THE INVENTION

The present invention concerns an apparatus comprising a first circuit and a second circuit. The first circuit may be configured to generate a first composited data signal and a second composited signal in response to a first data signal having a first chroma format and a second data signal having a second chroma format. The second circuit may be configured to generate a first composited output signal having the first chroma format in response to the first and the second composited data signals.

The objects, features and advantages of the present invention include providing a method for DVD subpicture compositing in 420 chroma format that may (i) preserve original 420 chroma format of main video data, (ii) remove flicker on subpicture blending in 420 chroma format, (iii) reduce amount of SDRAM storage for the output composited picture and/or (iv) reduce the amount of SDRAM bandwidth by moving around 420 chroma only.

BRIEF DESCRIPTION OF THE DRAWINGS

These and other objects, features and advantages of the present invention will be apparent from the following detailed description and the appended claims and drawings in which:

FIG. 1 is a block diagram of a conventional DVD playback system;

FIG. 2 is a block diagram illustrating a preferred embodiment of the present invention;

DETAILED DESCRIPTION OF THE PREFERRED EMBODIMENTS

Figure 3:
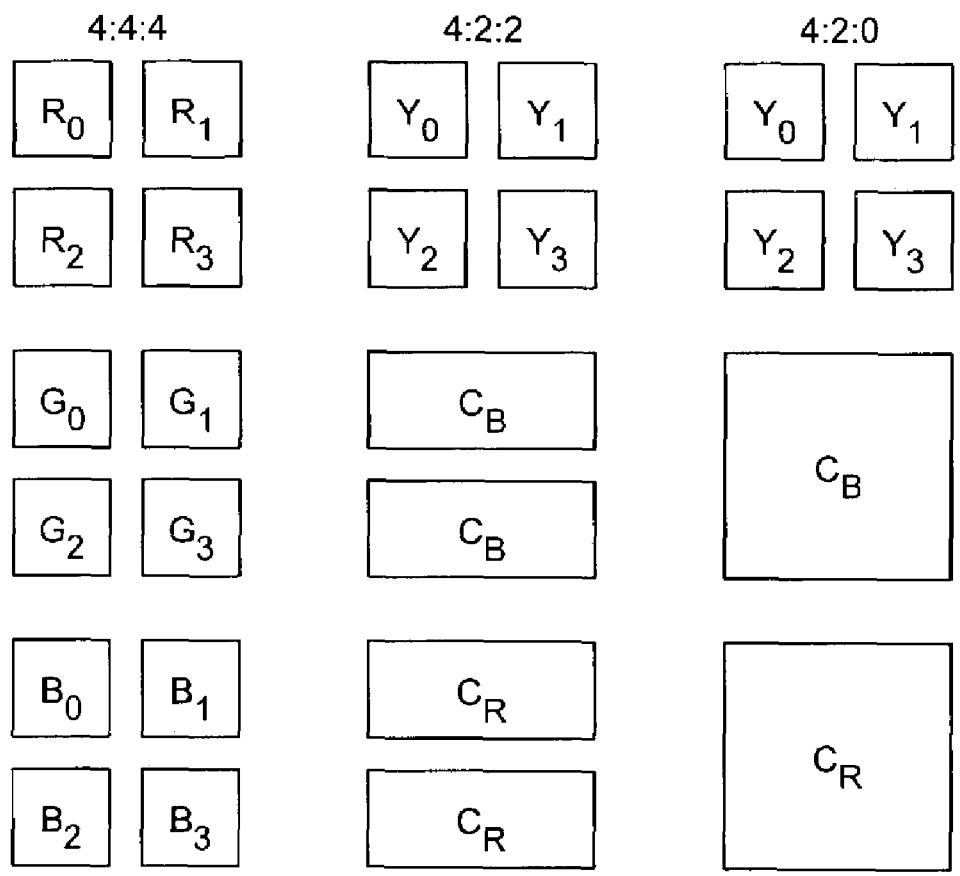
FIG. 3 is a block diagram illustrating various video pixel formats.

The present invention may provide a method and/or architecture for compositing a DVD subpicture onto a DVD main picture in the 420 chroma format. The present invention may reduce memory space and DMA bandwidth used during compositing by keeping the original 420 format of the DVD picture up to the display stage.

Referring to FIG. 2, a system 100 is shown illustrating a DVD playback system in accordance with a preferred embodiment of the present invention. The system 100 is generally configured to perform subpicture compositing of a chroma portion of the main picture in 420 chroma format. The composited picture is generally upsampled from the 420 format to 422 chroma format prior to display.

The system 100 generally comprises a demultiplexer 102, a video decoder 104, a subpicture decoder 106, an audio decoder 108, a subpicture compositing block 120, an upsampling block 122, a video presentation block 124 and an audio presentation block 126. The demultiplexer block 102 generally receives a signal (e.g., IN) from a recorded disc 130. The signal IN generally comprises navigation data, main image data, subpicture data and audio data multiplexed according to a predetermined compression scheme (e.g., MPEG-1, MPEG-2, etc.). The demultiplexer block 102 generally generates a main image data signal (e.g., V), a subpicture data signal (e.g., SP) and an audio data signal (e.g., A) in response to the signal IN. The signals V and SP may comprise, in one example, a luminance component (luma or Y) and a chrominance component (chroma). The chroma generally comprises a first component (e.g., Cr) and a second component (Cb).

The video decoder 104 generally processes the signal V and presents a signal (e.g., V1) to a first input of the compositing block 120. The signal V1 generally has a 420 chroma format. The subpicture decoder 106 generally processes the subpicture data signal SP and presents a signal (e.g., SP1) to a second input of the compositing block 120. The signal SP1 generally comprises subpicture data in a 444 16-color lookup table format. The compositing block 120 generally combines the subpicture signal SP1 with the main image data signal V1 to generate a composited signal (e.g., V2). The signal V2 generally comprises chroma data in the 420 format. The upsampling block 122 generally performs a 420 to 422 upsampling routine to generate a second composited signal (e.g., V3) in response to the signal V2.

The video presentation block 124 may be implemented as a monitor or other device configured to present a video image in response to the signal V3. The audio decoder 108 generally presents a signal A1 to the audio presentation device 126. The audio presentation device 126 may be configured to present audio signals, through devices such as loudspeakers, in response to the audio signal A1.

Referring to FIG. 3, a block diagram is shown illustrating various data formats for image pixels. Each pixel of a video image may be represented, in one example, by rectangular coordinates in a predetermined color space. In one example, a pixel may be described by three coordinates representing red, green and blue color values for the pixel. In an alternative scheme, each pixel may be described using a luminance value (e.g., Y) and two chrominance values (e.g., Cb and Cr) A sampling scheme may be implemented to reduce the amount of data used to represent an image (e.g., a compression scheme).

For example, an unsampled raw image may be referred to as a 4:4:4 format. In the 4:4:4 format, a group of four pixels is generally represented using four bytes of data for each color (e.g., red, green and blue for 12 bytes total). Alternatively, the four pixels may be represented, in one example, using four bytes of luminance data (e.g., Y0-Y3), two bytes of Cb data and two bytes of Cr data (e.g., in 4:2:2 format). By using the 4:2:2 format, the amount of space for storing chroma information may be reduced by 50%.

The amount of space used for storing chrominance data of an image may be further reduced (e.g, in half again) by converting the image into a 4:2:0 format. In the 4:2:0 format, the four pixels are generally represented by four bytes for luminance data (e.g., Y0-Y3), a single byte for the chroma Cb data and a single byte for the chroma Cr data. A DVD encoded using the MPEG-2 compression scheme generally stores the main image data in the 4:2:0 format and the subpicture data in the 444 16-color lookup table format.

Figure 4:
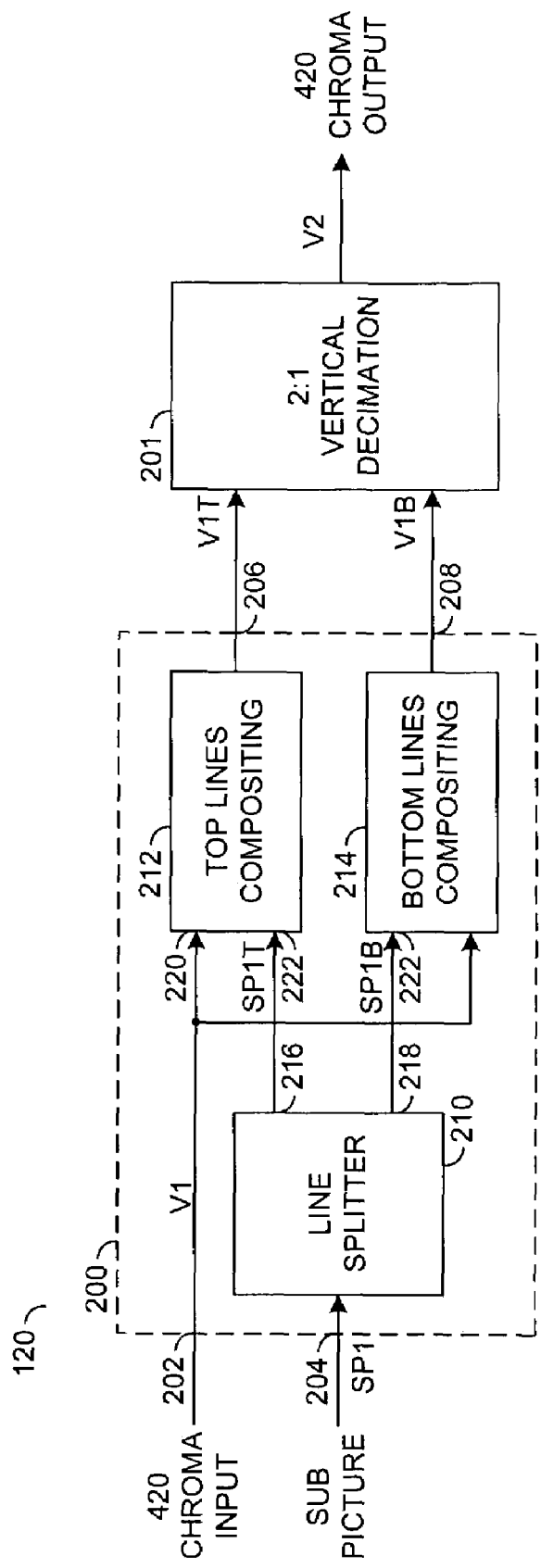
FIG. 4 is a more detailed block diagram illustrating subpicture compositing the present invention in accordance with a preferred embodiment.

Referring to FIG. 4, a more detailed block diagram of the circuit 120 of FIG. 2 is shown. The circuit 120 generally comprises, in one example, a circuit 200 and a circuit 201. The circuit 200 may be implemented as a compositing circuit (or block). The circuit 201 may be implemented as a decimating circuit (or block). In one example, the circuit 201 may be configured to perform 2:1 vertical decimation. The circuit 200 may have an input 202 that may receive the signal V1, an input 204 that may receive the signal SP1, an output 206 that may present a signal (e.g., V1T), and an output 208 that may present a signal (e.g., V1B). The circuit 200 is generally configured to generate the signals V1T and V1B in response to the signals V1 and SP1. The signals V1T and V1B may comprise composited data signals. The circuit 201 is generally configured to generate the signal V2 in response to the signals V1T and V1B.

The circuit 200 may comprise, in one example, a block (or circuit) 210, a block (or circuit) 212 and a block (or circuit) 214. The circuit 210 may be implemented, in one example, as a line splitter. The circuits 212 and 214 may be implemented as compositing blocks. The circuits 212 and 214 may be implemented similarly to conventional compositing blocks of a DVD player. The circuits 212 and 214 may be configured, in one example, to composite lines of main image chroma data with lines of subpicture chroma data. The circuit 204 may be configured, in one example, to composite top lines (e.g., the lines of the top or even field of an image). The circuit 206 may be configured, in one example, to composite bottom lines (e.g., the lines of the bottom or add field of the image).

The signal SP1 may be presented to an input of the circuit 210. The circuit 210 may have an output 216 that may present an intermediate signal (e.g., SP1T) and an output 218 that may present an intermediate signal (e.g., SP1B). The signal SP1T may comprise chroma Cb and Cr data from a top line (or field) of the subpicture data. The signal SP1B may comprise the chroma Cb and Cr data from a bottom line (or field) of the subpicture data.

In one example, the circuit 210 may be implemented as a switching (or demultiplexer) circuit. In general, subpicture data is stored separately for each of the fields of an image in accordance with the DVD specification. The decoder 106 generally decodes data (from a top field and then decodes data from a bottom field. The circuit 210 may be configured to send all of the decoded data for the top field to the circuit 212 and all the decoded data corresponding to the bottom field to the circuit 214.

The circuits 212 and 214 generally are configured to composite the chroma of each picture pixel in accordance with the DVD specification. For example, one sample of chroma (e.g., Cr) of a main picture pixel is generally combined with (i) the corresponding chroma sample of the color lookup table in the subpicture bitmap (e.g., the Cr sample if combining Cr of the original picture) and (ii) a 4-bit value for contrast or alpha value. In one example, the compositing of main picture and subpicture chroma Cr data may be expressed by the following equation Cr(result)=(1−alpha)*Cr(picture)+alpha*Cr(subpicture), where alpha is a 4-bit value and 0xf=1. Chroma Cb data for the main picture and subpicture are similarly composited.

The circuit 212 may have an input 220 that may receive the signal V1 and an input 222 that may receive the signal SP1T. The circuit 212 may be configured to generate the signal V1T by compositing the signals SP1T and V1. The circuit 214 may have an input 224 that may receive the signal V1 and an input 226 that may receive the signal SP1B. The circuit 214 may be configured to generate the signal V1B by compositing the signals SP1B and V1. The composited data signals V1T and V1B are generally in the 420 chroma format.

The circuit 201 generally comprises a 2:1 vertical decimation block. Although a 2:1 vertical decimation block is not generally found in a conventional DVD player, the circuit 201 may be implemented similarly to a conventional decimating block (e.g., from a record path of a conventional DVD recorder). The circuit 201 generally performs a 422 chroma format to 420 chroma format transformation. In one example, the circuit 201 may comprise a 2 tap vertical filter configured to produce one output line from two input lines.

Figure 5:
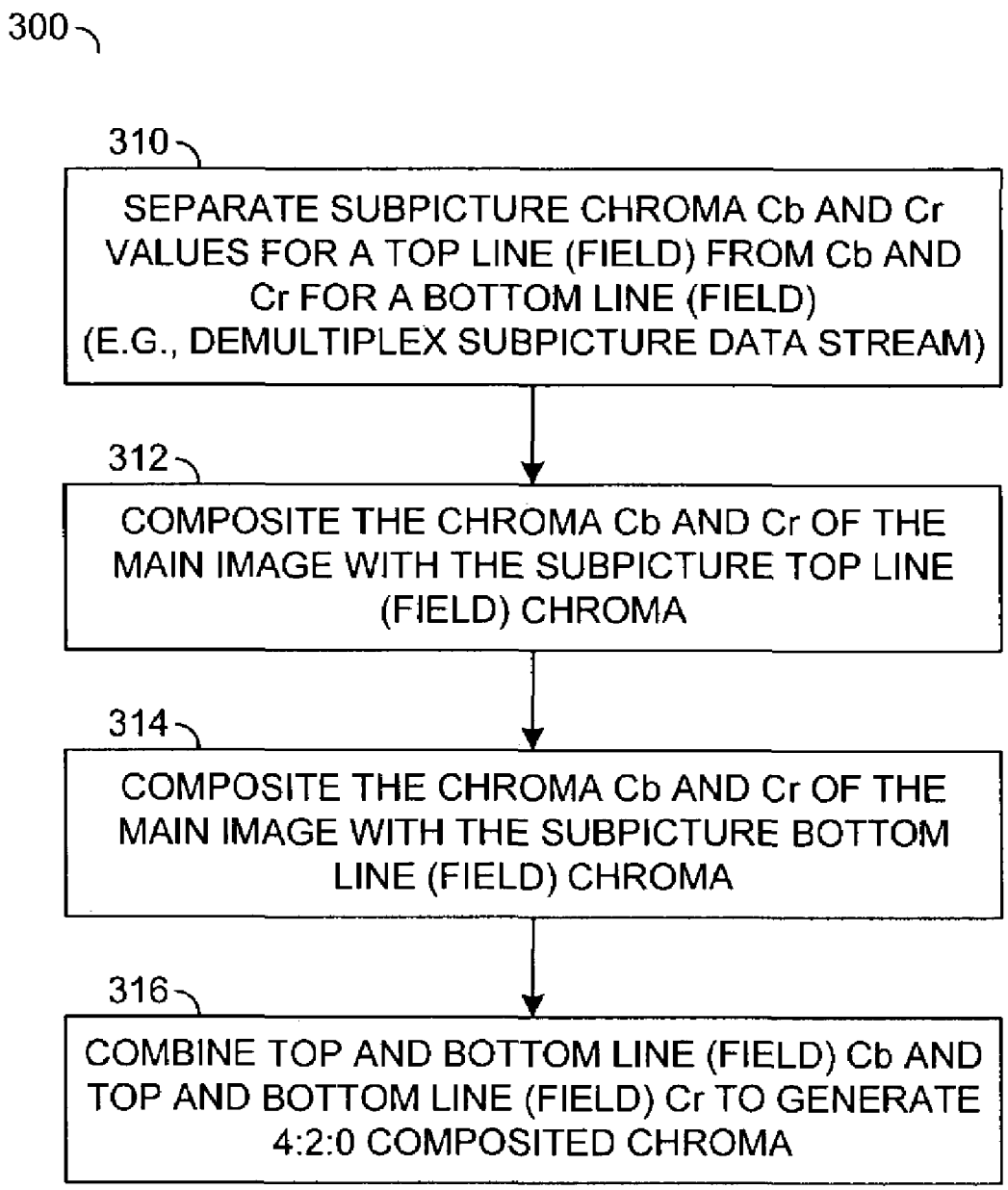
FIG. 5 is a flow diagram illustrating subpicture compositing in accordance with a preferred embodiment of the present invention.

Referring to FIG. 5, a flow diagram 300 is shown illustrating a compositing process in accordance with a preferred embodiment of the present invention. In a first step (e.g., the block 310), the subpicture chroma values for top and bottom lines (or fields) are generally separated (or split). The subpicture chroma values for the top lines are generally composited with chroma values for the main video image (e.g., the block 312). The subpicture chroma values for the bottom lines are generally composited with the chroma values of the main video image (e.g., the block 314). When the subpicture chroma values and main video chroma values have been composited for top and bottom lines, a 2:1 vertical decimation transform may be applied to combine the top and bottom lines of the composited chroma for presentation in the 4:2:0 format (e.g., the block 316).

Video data on DVD discs is generally encoded using MPEG 1 or MPEG 2 video specifications and is generally stored in 420 chroma format. Subpicture data on DVD discs is generally run length encoded and stored in 444 16-color lookup table format. The decoded subpicture data is generally stored as a bitmap using the 16-color lookup table. Because of the storage format of the subpicture data, filtering operations are generally not possible prior to compositing. However, space occupied by subpicture data is generally optimized. Filtering may be performed, in one example, by first converting the subpicture data into a 444 picture and filter down to 420 format. However, such filtering would generally negate the space savings of the bitmap format. The present invention provides a method and/or apparatus that maintains the original 420 chroma format during subpicture compositing in order to reduce memory space and DMA bandwidth for any processing (e.g., filtering, etc.) that may be performed on the composited picture. The composite picture may be upsampled (e.g., 420 to 422 format) prior to presentation (e.g. on a computer monitor, television, etc.).

The function performed by the flow diagram of FIG. 5 may be implemented using a conventional general purpose digital computer programmed according to the teachings of the present specification, as will be apparent to those skilled in the relevant art(s). Appropriate software coding can readily be prepared by skilled programmers based on the teachings of the present disclosure, as will also be apparent to those skilled in the relevant art(s).

The present invention may also be implemented by the preparation of, for example, application specific integrated circuits (ASICs), application specific standard products (AS-SPs), field programmable gate arrays (FPGAs), or by interconnecting an appropriate network of conventional component circuits, as is described herein, modifications of which will be readily apparent to those skilled in the art(s).

The present invention thus may also include a computer product which may be a storage medium including instructions which can be used to program a computer to perform a process in accordance with the present invention. The storage medium can include, but is not limited to, any type of disk including floppy disk, optical disk, CD-ROM, and magneto-optical disks, ROMS, RAMs, EPROMs, EEPROMs, Flash memory, magnetic or optical cards, or any type of media suitable for storing electronic instructions.

While the invention has been particularly shown and described with reference to the preferred embodiments thereof, it will be understood by those skilled in the art that various changes in form and details may be made without departing from the spirit and scope of the invention.

The invention claimed is:

1. An apparatus comprising:
   a first circuit configured to (i) receive a first decoded data signal having a first chroma format from a video decoder circuit and a second decoded data signal having a second chroma format from a subpicture decoder circuit and (ii) generate a first composited data signal and a second composited signal in response to said first decoded data signal and said second decoded data signal, wherein said first circuit comprises (i) a line splitter circuit configured to separate said second decoded data signal into a first intermediate signal and a second intermediate signal, (ii) a first compositing circuit configured to generate said first composited data signal by compositing said first decoded data signal and said first intermediate signal and (iii) a second compositing circuit configured to generate said second composited data signal by compositing said first decoded data signal and said second intermediate signal; and
   a second circuit configured to generate a first composited output signal having said first chroma format in response to said first and said second composited data signals, wherein said second circuit comprises a decimator circuit configured to generate said first composited output signal in response to said first composited data signal and said second composited data signal.

2. The apparatus according to claim 1, wherein said first chroma format comprises a 4:2:0 chroma format.

3. The apparatus according to claim 1, wherein said second chroma format comprises a 444 16-color lookup table format.

4. The apparatus according to claim 1, further comprising:
   a third circuit configured to convert said first composited output signal from said first chroma format to a third chroma format.

5. The apparatus according to claim 4, wherein said third chroma format comprises a 4:2:2 chroma format.

6. The apparatus according to claim 1, wherein:
   said first decoded data signal comprises a decoded video data stream; and
   said second decoded data signal comprises data from one or more decoded subpicture data streams.

7. The apparatus according to claim 1, wherein said first intermediate signal comprises data from a top field and said second intermediate signal comprises data from a bottom field.

8. The apparatus according to claim 1, wherein said decimator circuit is configured to perform 2:1 vertical decimation.

9. The apparatus according to claim 1, wherein said apparatus is configured as a playback path of a digital video disc (DVD) player.

10. The apparatus according to claim 1, further comprising:
    a demultiplexer circuit configured to recover a video data stream and one or more subpicture data streams in response to a presentation data stream from a recorded DVD;
    a video decoder circuit configured to generate said first decoded data signal in response to said video data stream;
    a subpicture decoder circuit configured to generate said second decoded data signal in response to said one or more subpicture data streams; and
    an upsampling circuit configured to (i) receive said first composited output signal and (ii) generate a second composited output signal having a third chroma format in response to said first composited output signal.

11. An apparatus comprising:
    means for generating a composited output signal having a first chroma format in response to a first composited data signal and a second composited data signal, wherein the composited output signal generating means comprises a decimator circuit configured to generate said first composited output signal in response to said first composited data signal and said second composited data signal; and
    means for generating said first and said second composited data signals in response to a first decoded data signal received from a video decoder circuit and a second decoded data signal received from a subpicture decoder circuit, wherein (i) said first decoded data signal has said first chroma format and said second decoded data signal has a second chroma format, (ii) said first composited data signal is generated by combining said first decoded data signal and a top field of said second decoded data signal and (iii) said second composited data signal is generated by combining said first decoded data signal and a bottom field of said second decoded data signal.

12. A method for providing playback of a DVD image comprising:

receiving a first decoded data signal having a first chroma format from a video decoder circuit;

receiving a second decoded data signal having a second chroma format from a subpicture decoding circuit;

generating (i) a first intermediate signal comprising data from a top field and (ii) a second intermediate signal comprising data from a bottom field in response to said second decoded data signal;

generating a first composited data signal having said first chroma format by compositing said first decoded data signal and said first intermediate signal;

generating a second composited data signal having said first chroma format by compositing said first decoded data signal and said second intermediate signal; and generating a first composited output signal by decimating said first composited data signal and said second composited data signal.

13. The method according to claim 12, further comprising: converting said first composited output signal to a third chroma format.

14. The method according to claim 12, further comprising: generating said first decoded data signal from a video data stream of a DVD.

15. The method according to claim 14, further comprising: generating said second decoded data signal in response to one or more subpicture data streams from said DVD.

16. The method according to claim 15, further comprising: demultiplexing said video data stream, said one or more subpicture data streams and an audio data stream from a presentation data stream of said DVD.

17. The method according to claim 12, further comprising: generating said first composited data signal by compositing a top line of said second decoded data signal with a line of said first decoded data signal; and generating said second composited data signal by compositing a bottom line of said second decoded data signal with said line of said first decoded data signal.

18. The method according to claim 12, further comprising: generating a second composited output signal by upsampling said first composited output signal.

19. The method according to claim 12, wherein said decimating comprises a 2:1 vertical decimation.

20. The method according to claim 18, further comprising: presenting an image in response to said second composited output signal.

* * * * *